United States Patent [19]
Zaleski

[11] 3,836,855
[45] Sept. 17, 1974

[54] MODULATING SYSTEM
[75] Inventor: John F. Zaleski, Valhalla, N.Y.
[73] Assignee: The Singer Company, New York, N.Y.
[22] Filed: May 5, 1958
[21] Appl. No.: 733,210

[52] U.S. Cl............. 325/113, 325/8, 330/33, 330/34, 332/54, 340/152 T, 340/210, 340/310 A, 343/6.8 R
[51] Int. Cl........ G01s 9/56, H04b 7/14, H02j 13/00
[58] Field of Search.... 250/6, 20 T, 13, 6 A, 214 R, 250/215, 212; 343/100, 5, 18, 6.8 R, 6.5 SS, 6.8 LC; 340/310 A, 310 R, 210, 152 T, 189 MB; 325/1, 8, 185, 113; 330/12, 33, 34, 145; 332/52 T, 54

[56] References Cited
UNITED STATES PATENTS

| | | | |
|---|---|---|---|
| 2,193,102 | 3/1940 | Koch | 250/6 |
| 2,461,005 | 2/1949 | Southworth | 343/5 |
| 2,607,004 | 8/1952 | Harris | 250/6 |
| 2,777,057 | 1/1957 | Pankove | 250/20 T |
| 2,812,427 | 11/1957 | Magondeaux | 343/6.8 R |
| 2,812,428 | 9/1957 | Rath | 325/8 |
| 2,813,242 | 11/1957 | Crump | 250/20 T |
| 2,851,592 | 9/1958 | Webster | 250/13 |
| 2,899,546 | 8/1959 | Hollmann | 343/6.8 R |
| 2,927,321 | 3/1960 | Harris | 343/6.8 R |
| 2,943,189 | 6/1960 | Crump | 343/6.8 R |
| 3,002,087 | 9/1961 | Holt | 325/185 |
| 3,018,475 | 1/1962 | Kleist et al. | 325/8 |
| 3,098,971 | 7/1963 | Richardson | 325/185 |

*Primary Examiner*—Maynard R. Wilbur
*Assistant Examiner*—H. A. Birmiel
*Attorney, Agent, or Firm*—T. W. Kennedy

EXEMPLARY CLAIM

10. A modulating system comprising, an electronic valve, an amplifier circuit connected to said valve and including an input circuit and an output circuit, means for connecting a signal voltage to said input circuit, a unidirectional conducting device connected in said output circuit serving the triple function of the power supply for said valve, the load across which the useful output voltage is developed, and a modulating element, and an antenna for concentrating incident electromagnetic wave energy upon said device and for reradiating a portion of the incident energy after modulation by said signal voltage.

12 Claims, 6 Drawing Figures

PATENTED SEP 17 1974 3,836,855
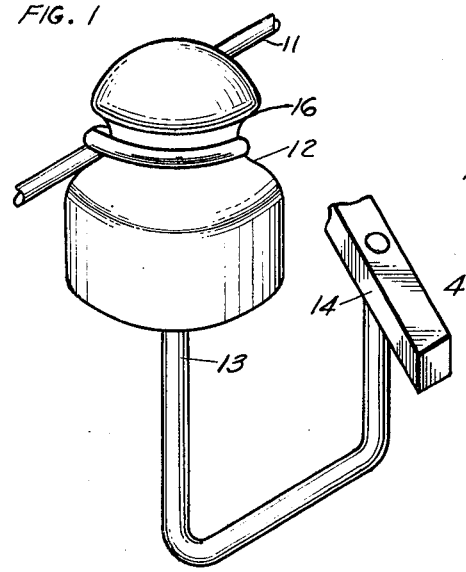
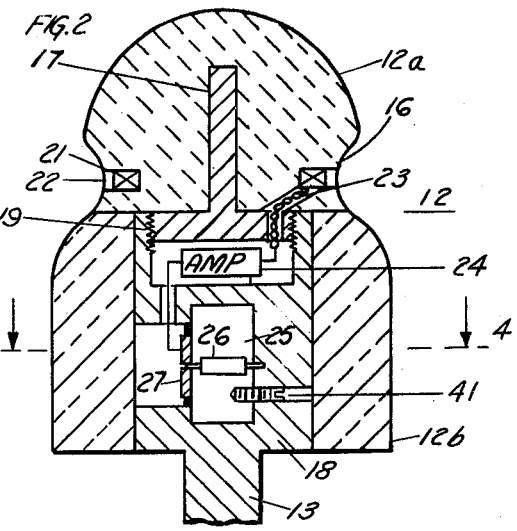
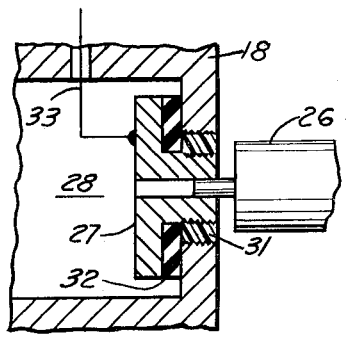
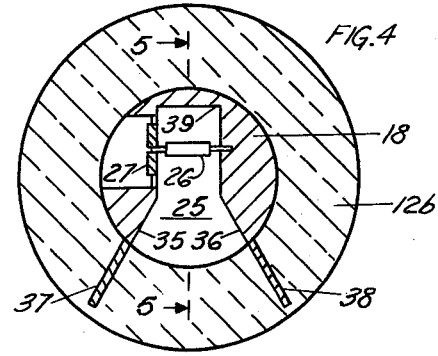
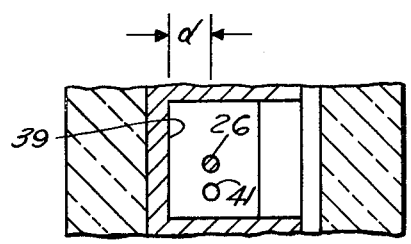
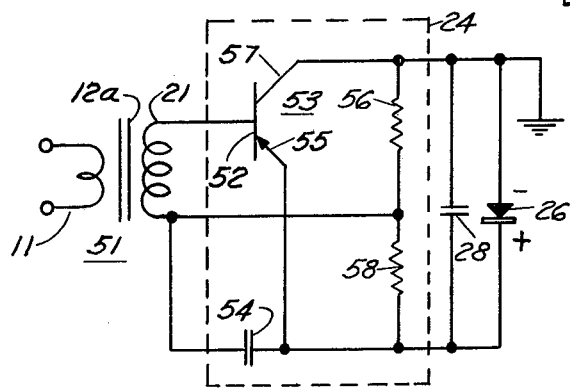
INVENTOR.
JOHN F. ZALESKI
BY H. S. Mackey
ATTORNEY

MODULATING SYSTEM

This invention relates to a system for modulating electromagnetic wave energy with intelligence and transmitting the modulated energy to another point.

It is frequently useful to be able to impress a locally available signal voltage as modulation upon radio frequency energy which is transmitted through space to the locality of the signal voltage so that the radio frequency energy, when reradiated, may carry the signal to a remote point. For example, trouble in an overhead transmission line could be easily localized by putting a test tone on the line, equipping an automobile with a transmitter and receiver, and driving along the route of the line while beaming radio frequency energy to the line from time to time. As long as the test tone is picked up, it can be assumed that the line is intact while failure to receive the test tone indicates a discontinuity of some sort since the last reception of the test signal.

Devices of the general class mentioned above have been devised in the past but have been subject to a number of disadvantages. Some have been bulky, others have returned but a weak signal, while still others have required a source of energy at the modulating point.

It is a general object of the present invention to provide apparatus for modulating and transmitting electromagnetic wave energy.

Another object of the invention is to provide apparatus for receiving radiant energy, modulating the energy with intelligence, and reradiating the energy.

A further object of the invention is to provide compact apparatus requiring no local power supply yet capable of receiving energy at a carrier frequency, modulating the energy at a lower frequency and radiating a strong modulated signal.

Another object is to supply a load with direct current, the power source for which is radiant energy.

In accordance with the invention, the above objectives are attained by apparatus including an antenna for creating a region of high field strength from incident radiant energy. A crystal diode or other nonlinear component is located in the high field strength region and is connected to the modulating signal. By this arrangement, the incident radiant energy is modulated by the signal and reradiated by the antenna. To increase the effectiveness, the modulating signal may be amplified by an amplifier powered by the incident radiant energy.

For a clearer understanding of the invention, reference may be made to the following detailed description of a specific embodiment and the accompanying drawing in which:

FIG. 1 is a pictorial view of an installation of the invention;

FIG. 2 is a vertical cross sectional view of the device shown in FIG. 1;

FIG. 3 is a fragmentary cross sectional view taken on the same plane as FIG. 2 but drawn to a larger scale;

FIG. 4 is cross sectional view taken on the line 4-4 of FIG. 2;

FIG. 5 is a fragmentary cross sectional view taken on the line 5—5 of FIG. 4; and FIG. 6 is a schematic diagram of the electrical connections.

Referring first to FIG. 1, there is shown one conductor 11 of an overhead transmission line supported by a pole line insulator 12 carried by a pole mounting hook 13 which in turn is fastened to a cross arm 14. The arrangement so far described appears to be, and is, quite conventional except for the insulator 12 which is of special construction. Instead of being made of the usual ceramic or glass, the insulator 12 is made at least in part of a ferromagnetic dielectric and also contains special equipment in interior compartments. The ferromagnetic dielectric used is preferably one of the family of gyromagnetic ferrites such as a manganese-magnesium ferrite or an yttrium ferrite.

As shown in FIG. 2, the body of the insulator 12 may be made in two parts, the upper portion 12a being the ferrite portion while the lower portion 12b may be of porcelain or other insulating material, joined to the upper portion 12a by any suitable means such as an epoxy resin type of adhesive. If desired the entire insulator could be of ferrite but the two part construction shown operates equally as well and requires less ferrite, which is a manufacturing advantage since machining operations on the ferrite material are very difficult. When the two part construction is used it is preferred to glaze the entire outer surface to present a uniform appearance.

As shown in both FIGS. 1 and 2, the upper (ferrite) portion 12a of the insulator 12 has an exterior annular groove 16 to assist in holding the conductor 11 in position. The upper portion 12a also has an axial aperture extending upward from the bottom and into which is fastened a metal member 17. The member 17 is formed with an upper rod shaped portion which fits into the aperture and has an integral disc shaped portion which bears on the lower surface of the portion 12a.

The lower portion 12b of the insulator 12 has the shape of a cylindrical shell and its upper surface is fastened to the lower surface of the portion 12a. The axial aperture is substantially filled by a generally cylindrical brass body 18 the outer surface of which may be bonded to the inner surface of portion 12b. The upper portion of body 18 has a large axial bore with inside threads 19 which engage corresponding outside threads on the disc shaped portion of the member 17. The lower portion of body 18 extends beneath the insulator 12 and is integral with the pole hook 13.

The upper portion 12a of the insulator 12 contains an annular space in the region of the annular groove 16 in which is a multi-turn winding 21. The space is first made as a slot in which wire is wound to form winding 21 after which an annular filler portion 22 is formed to conceal the winding 21. The leads 23 from the winding 21 pass through internal apertures in both the portion 12a and the disc portion of the member 17 to the bore in the body 18. In this bore is located a small amplifier 24, to be fully described subsequently, to which the leads 23 are connected.

The body 18 contains a recess 25 below the previously mentioned bore in which is mounted a crystal diode 26. One terminal of the diode is connected to the metal body 18 while the other terminal is connected to a bushing 27 which constitutes one plate of a small capacitor 28. As best shown in FIG. 3, the body 18 has a small horizontal aperture into which is threaded a sleeve 31 of insulating material such as nylon. The bushing 27 is threaded into the sleeve 31 and is provided with an axial aperture which engages one terminal of the diode 26. A thin washer 32 of a dielectric such as mica separates the flat portion of the bushing 27 from the body 18, these three elements constituting the small capacitor 28 of the order of 50 micro microfarads. A conductor 33 having one end connected to the bushing 27 passes through an aperture in the body 18 and is connected to the amplifier 24. The capacitor 28 serves to by pass to ground radio frequency energy which might otherwise be propagated along the conductor 33.

As shown in FIG. 4, the rear portion of recess 25 containing the diode 26 is rectangular in cross section and constitutes a rectangular waveguide while the forward portion has sloping surfaces 35 and 36 which constitute the boundaries of a horn antenna. The taper of the surfaces 35 and 36 is continued by two metal plates 37 and 38 imbedded in the dielectric of the lower portion 12b of the insulator 12. The antenna serves to concentrate incident radio frequency energy on the diode 26 and also to couple modulated radio frequency energy to free space. For best operation the distance d, FIG. 5, from the diode to the rear surface 39, would normally be made approximately equal to one-quarter of the waveguide wavelength, but in the present embodiment the dimensions of the components would not permit so great a spacing. However, an excellent match has been obtained by threading a small screw 41 into the body 18 beside the diode 26, as shown in FIGS. 2 and 5. This screw capacitively loads the waveguide formed by recess 25 so that it becomes substantially shorter electrically than it would be otherwise.

Referring now to FIG. 6, there is shown a transformer 51 the core 12a of which is the upper portion of the insulator 12, the secondary 21 of which is the winding 21 also shown in FIG. 2, and the primary 11 of which is the conductor 11 shown in FIG. 1. The primary may consist of one half a turn, one turn (as shown in FIG. 1) or more turns, depending upon the arrangement for fastening the conductor 11 to the insulator 12. The secondary 21 has its first terminal connected to the base 52 of a PNP transistor 53 and its second terminal connected through a large capacitor 54, on the order of 4 microfarads, to the emitter 55. A resistor 56 has one terminal connected to the collector 57 and its other terminal connected to the second terminal of secondary 21, while a resistor 58 has one terminal also connected to the second terminal of winding 21 and its other terminal connected to the emitter 55. Resistors 56 and 58 may have values on the order of 15 thousand and 10 thousand ohms respectively. The terminal of resistor 56 which is connected to the collector 57 is also connected to the anode of the crystal diode 26 while the terminal of resistor 58 which is connected to the emitter 55 is also connected to the cathode of the diode 26. The capacitor 28, also shown in FIG. 3, shunts the diode 26. The components within the dotted lines of FIG. 6 (transistor 53, capacitor 54 and the two resistors 56 and 58) are the components which comprise the amplifier 24 shown in FIG. 2.

To describe the operation, assume that an insulator as above described is installed on an open wire line which is to be tested. Assume that a suitable signal such as a 1,000 cycle tone, a phonograph record, or the like, is impressed on the line and also assume that there is available an automobile equipped with a suitable transmitter-receiver capable of directing radio frequency energy toward and receiving energy from a desired direction. When radio frequency energy reaches the insulator 12, the horn antenna comprising the plates 37 and 38 and the surfaces 35 and 36 concentrates the energy in the waveguide portion of the recess 25. The diode 26 now serves its first purpose by rectifying a portion of the incident energy causing a voltage to appear across its terminals with the polarity shown in FIG. 6. At the same time the transformer 51 steps up the signal voltage and applies it across the base 52 and emitter 55. The voltage across the diode 26 serves as a power supply for the transistor amplifier, the input signal is amplified, and the diode 26 serves its second purpose by acting as the output element or load of the amplifier across which the useful output voltage is developed.

In the usual amplifier, three components are connected in series, namely, a power supply, an electronic valve such as a transistor or an electronic tube, and an output element such as a resistor or transformer through which the output current flows and across which the output voltage is developed. If the power supply has very poor voltage regulation, variations in the signal will cause variations in the voltage across the power supply. Such operation is normally undesirable and in order to avoid such operation power supplies usually comprise batteries of adequate capacity or include electrical storage devices such as large capacitors or inductors to hold the voltage across the power supply constant so that all variations appear across the output element. In the present invention the power supply is the diode 26, there are no storage elements to hold the voltage constant (the capacitor 28 is so small that it is effective only at radio frequencies), the power supply has poor regulation, and variations in the signal cause corresponding variations in the voltage across diode 26. Therefore, the usual output element is unnecessary and the diode 26 serves as both power supply and amplifier output element or load.

The diode 26 also serves a third purpose which is that of a modulator. The action can be thought of as one involving a changing impedance. If the circuit comprising the diode 26 and the waveguide containing it presented to the incident wave, at all times, an impedance equal to the characteristic impedance, then of course all the incident energy would be absorbed and none reflected. However, the impedance of the diode is changing continuously due to the signal voltage and the incident wave "sees" a changing impedance. The result is that a portion of the incident power is reflected, the portion varying continuously as a function of the signal. This reflected and modulated radio frequency energy in recess 25 passes to the antenna (surfaces 35 and 36, plates 37 and 38) is radiated into space, and may be picked up by the receiver in the automobile.

It is thus seen that the present invention enables radio frequency energy to be received, modulated, and reradiated, all with compact apparatus requiring no power other than that provided by the signal and carrier wave energy. A number of features contribute to this desirable result, one of which is the dual function of the ferrite portion 12a which acts both as a conventional insulator and as a ferromagnetic transformer core. Another important feature is the triple function of the diode 26 which acts as (1) a rectifier to provide power for the amplifier from incident radio frequency energy; (2) the output element of the amplifier across which the useful output voltage is developed; and (3) a modulating element for modulating the incident radio frequency energy with the signal voltage.

Although a specific embodiment has been described, many modifications such as additions or omissions can be made within the spirit of the invention. It is therefore desired that the invention be limited only by the true scope of the appended claims.

What is claimed is:

1. An amplifier circuit comprising, an electronic valve, an input circuit for coupling an input signal to said valve, an output circuit for said valve, a unidirectional voltage source characterized by a terminal voltage which decreases as the current increases, and means for connecting said source into said output circuit, whereby variations in the terminal voltage of said source represent the desired amplifier output.

2. An amplifier circuit comprising, an electronic valve having first, second and third electrodes, means for applying an input signal between said first and second electrodes, a unidirectional conducting device having first and second electrodes, means for connecting said first electrode of said device directly to said second electrode of said valve, and means for connecting said second electrode of said device directly to said third electrode of said valve, whereby variations in the voltage across said device constitute the useful output of said amplifier.

3. An amplifier circuit comprising, an electronic valve having first, second and third electrodes, means for applying an input signal between said first and second electrodes, a voltage divider connected across said second and third electrodes and having an intermediate point connected to said first electrode, a rectifying element having first and second terminals, means for connecting said first terminal directly to said second electrode and means for connecting said second terminal directly to said third electrode, whereby the incidence of radio frequency energy upon said element energizes said valve and causes voltage variations to appear across said element, which variations are an amplified version of the input signal.

4. A modulating system comprising, an antenna for intercepting radio frequency energy and creating a region of high field strength, a rectifying element positioned in said region, an electronic amplifier, means for connecting the input circuit of said amplifier to a source of signal voltage, and means for connecting said rectifying element in the output circuit of said amplifier, whereby radio frequency energy incident upon said antenna causes a unidirectional voltage to appear across said rectifying element, said voltage acts as the power supply for said amplifier, voltage variations corresponding to said signal voltage appear across said element in amplified form, and said voltage variations modulate the incident radio frequency energy which is then reradiated.

5. A modulating system comprising, a transistor including a base, an emitter and a collector, means for applying a signal voltage across said base and said emitter, a voltage divider connected between said collector and said emitter and having an intermediate portion connected to said base, a radio frequency transmission path, an antenna coupled to said path, a rectifying element positioned to be subjected to the field associated with said transmission path, a capacitor having low impedance to radio frequencies but high impedance to signal frequencies connected in parallel with said rectifying element, and means for connecting said collector and said emitter in parallel with said rectifying element, whereby said rectifying element serves as an element in the power supply for said transistor, as the output element for the transistor amplifier, and as a modulating element.

6. A modulating system comprising, a conductor carrying a signal current, a support member, an insulator for enabling said conductor to be supported by said member yet electrically insulated therefrom, said insulator being made at least in part of a ferromagnetic dielectric, a multi-turn winding carried by said insulator and constituting one winding of a transformer the other winding of which is said conductor and the core of which is the ferromagnetic portion of said insulator, an antenna for concentrating incident radio frequency energy into a region of high field strength, a rectifying element positioned in said region, an amplifier having its input connected to said winding, and means for connecting said rectifying element in the output circuit of said amplifier.

7. A modulating system comprising, a conductor carrying a signal current, a support member, an insulator for enabling said conductor to be supported by said member yet electrically insulated therefrom, said insulator being made at least in part of a ferromagnetic dielectric, a multi-turn winding carried by said insulator and constituting one winding of a transformer the other winding of which is said conductor and the core of which is the ferromagnetic portion of said insulator, a transistor including a base, an emitter, and a collector, means for applying the signal voltage of said one winding across said base and said emitter, a voltage divider connected between said collector and said emitter and having an intermediate portion connected to said base, a radio frequency transmission path, an antenna coupled to said path, a rectifying element positioned to be subjected to the electromagnetic field associated with said transmission path, a capacitor connected in parallel with said rectifier element having low impedance to radio frequencies but high impedance to signal frequencies, and means for connecting said collector and said emitter in parallel with said rectifying element.

8. An amplifier circuit comprising, an electronic valve, an input circuit connected to said valve, means for connecting a signal voltage to said input circuit, an output circuit connected to said valve, and a component connected in said output circuit serving the dual function of the power supply for said valve and the load across which the useful output voltage is developed, said component comprising a unidirectional voltage source having poor voltage regulation.

9. An amplifier circuit comprising, an electronic valve, an input circuit connected to said valve, means for connecting a signal voltage to said input circuit, a network for biasing all of the electrodes of said valve from a single source of unidirectional voltage, an output circuit connected to said valve, a component connected in said output circuit serving the dual function of the power supply for said valve and the load across which the useful output voltage is developed, said component comprising a unidirectional voltage source having poor voltage regulation, and means for connecting said component to said network.

10. A modulating system comprising, an electronic valve, an amplifier circuit connected to said valve and including an input circuit and an output circuit, means for connecting a signal voltage to said input circuit, a unidirectional conducting device connected in said output circuit serving the triple function of the power supply for said valve, the load across which the useful output voltage is developed, and a modulating element, and an antenna for concentrating incident electromagnetic wave energy upon said device and for reradiating a portion of the incident energy after modulation by said signal voltage.

11. A modulating system comprising, an electronic valve, an amplifier circuit connected to said valve and including an input circuit and an output circuit, means for connecting a signal voltage to said input circuit, a network for biasing all of the electrodes of said valve from a single source of unidirectional voltage, an antenna for concentrating incident electromagnetic wave energy to create a region of high field strength and for reradiating a portion of the received energy, a unidirectional conducting device positioned in said region, and means for connecting said device in said output circuit and to said network, whereby said device serves the triple purpose of the power supply for said valve, the load across which the useful output voltage of said amplifier is developed, and the modulating element.

12. Modulating apparatus comprising, a horn antenna for gathering incident microwave energy and creating a region of high field strength, a crystal diode positioned in said region, and means for applying a signal voltage to said diode, whereby microwave energy reaching said antenna will be modulated by said signal voltage and said antenna will radiate the modulated energy.

* * * * *